June 14, 1960

W. T. PEIRCE 2,940,883

APPARATUS FOR HOT PRESTRESSING ARMORED CABLE

Filed May 1, 1956

INVENTOR.
WALTER T. PEIRCE
BY
Donald G. Dalton
HIS ATTORNEY

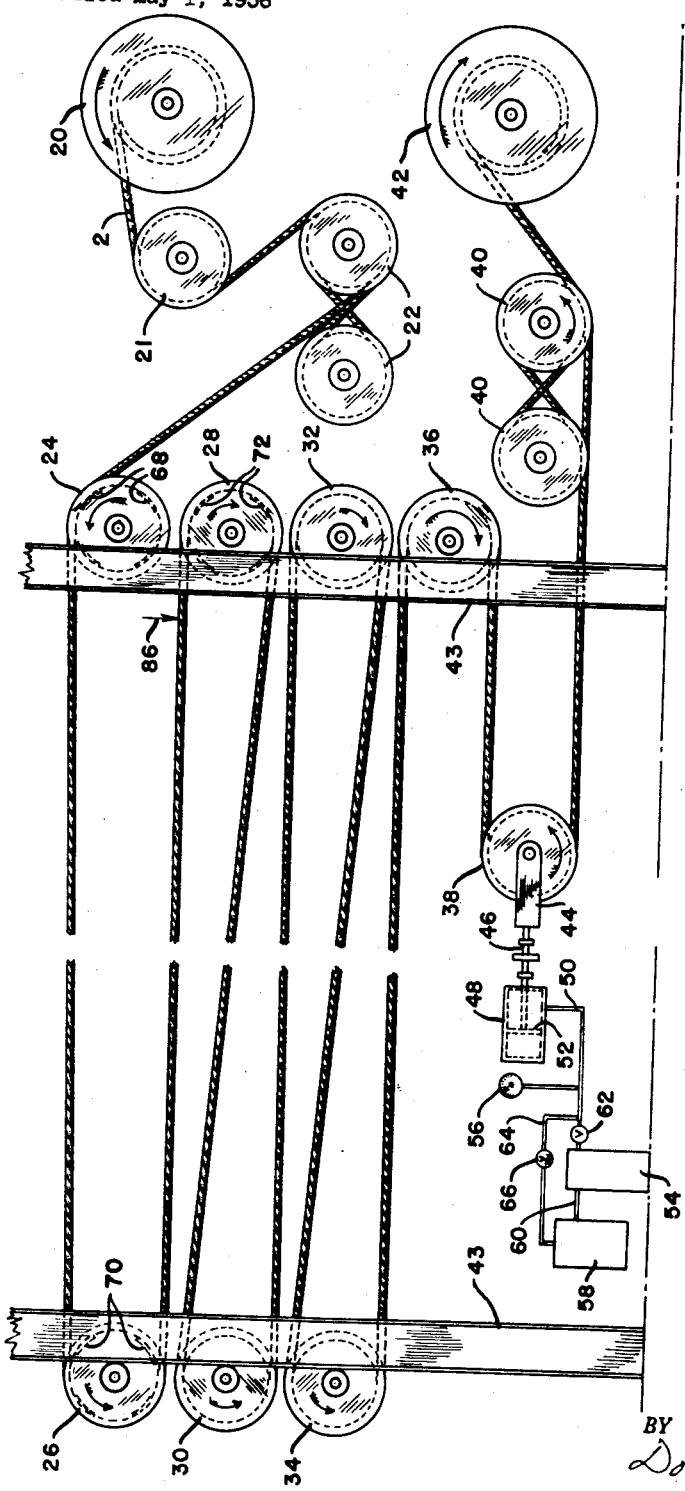

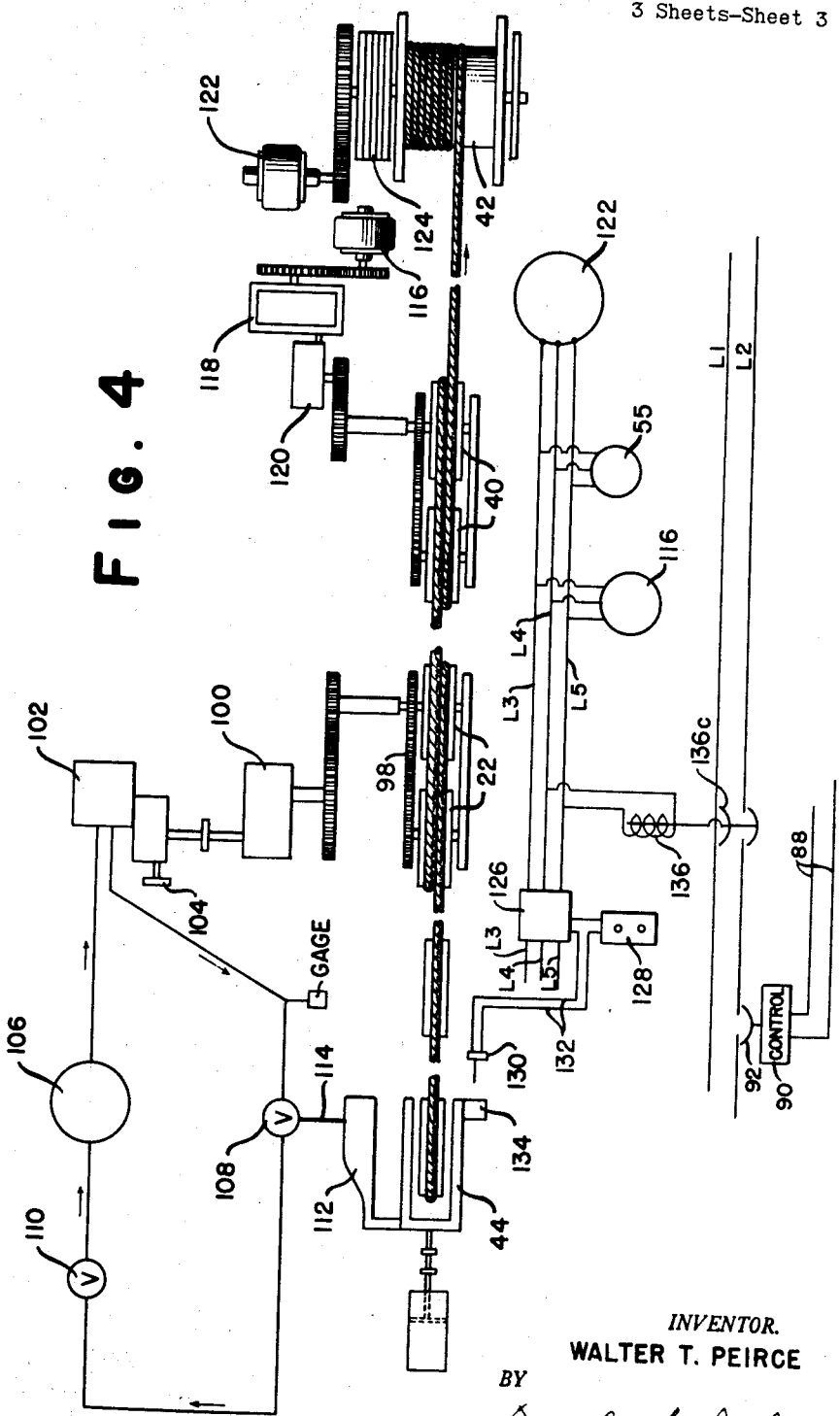

2,940,883

APPARATUS FOR HOT PRESTRESSING ARMORED CABLE

Walter T. Peirce, Worcester, Mass., assignor to United States Steel Corporation, a corporation of New Jersey Filed May 1, 1956, Ser. No. 581,928

8 Claims. (Cl. 154—2.27)

This invention relates to apparatus for hot prestressing armored cable, particularly well logging cables. As shown in the patents to Schlumberger No. 1,913,293, dated June 6, 1933, and Elliott No. 2,216,340, dated October 1, 1940, electric cable is used in determining the characteristics of the strata at various levels in the well. After the characteristics of the various levels have been determined it is then possible to determine at what level the oil well casing should be drilled in order to obtain oil. Oil wells have depths as great as 20,000 feet and the oil well logging cable must be of sufficient length to reach that depth. The cable must be of sufficient flexibility to be wound on a drum and must be adapted to withstand high fluid pressures and temperatures as high as 350° F. Since the well is generally filled with liquid, such as water or oil, the cable must also be fluid-proof. Also, because of the great length of cable involved it is very desirable and necessary for good results that the cable not take a permanent elongation under its own weight or under load. If the cable elongates as much as one-tenth percent the reading of the well logging cable will be off as much as twenty feet. As a result, when the casing is drilled the opening will not be at the correct level.

A logging cable subjected to the stress of its own weight in vertical suspension will elongate but that portion of its elongation due to elastic deformation can be measured or compensated for to provide accurate depth measurements. However, it is important that the cable should not have a permanent elongation, particularly of a continuing nature. Otherwise all length calculations or measurements will be inaccurate. It has been the practice to subject all such cables to a load equal to 60% of its rated strength to remove any permanent elongation. This method has been partially successful, but if the insulated core of the cable is not completely compacted by this prestress it will not lend support to the outer armor and continuing elongation of the cable will result. I have found that if the prestressing load is applied to the cable while it is heated to between 140° and 190° F. the components of the core will compact to such an extent that no further permanent elongation of the cable will occur.

It is therefore an object of my invention to provide apparatus for hot prestressing armored cable.

This and other objects will be more apparent after referring to the following specification and attached drawings, in which:

Figure 3 is a schematic side elevation of the apparatus of Figure 2; and

Figure 4 is a schematic plan view showing the take-up reel, entry and exit capstan sheaves, and including the driving circuit.

Figure 1:
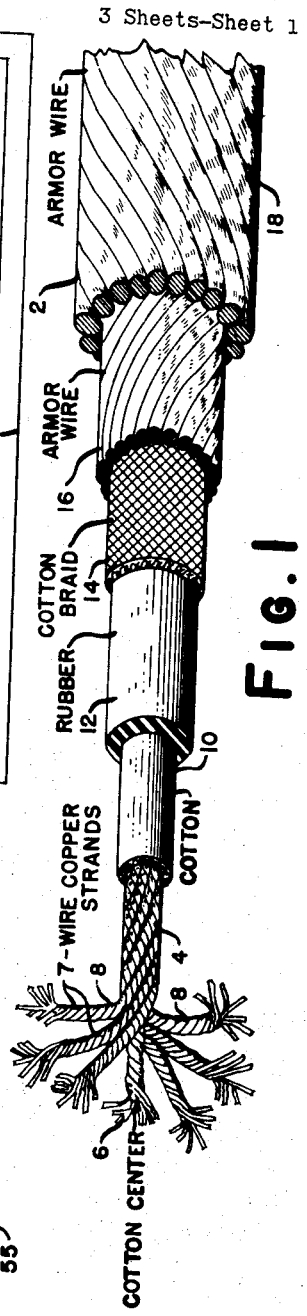
Figure 1 is a view of a well logging cable with part broken away.
Figure 2:
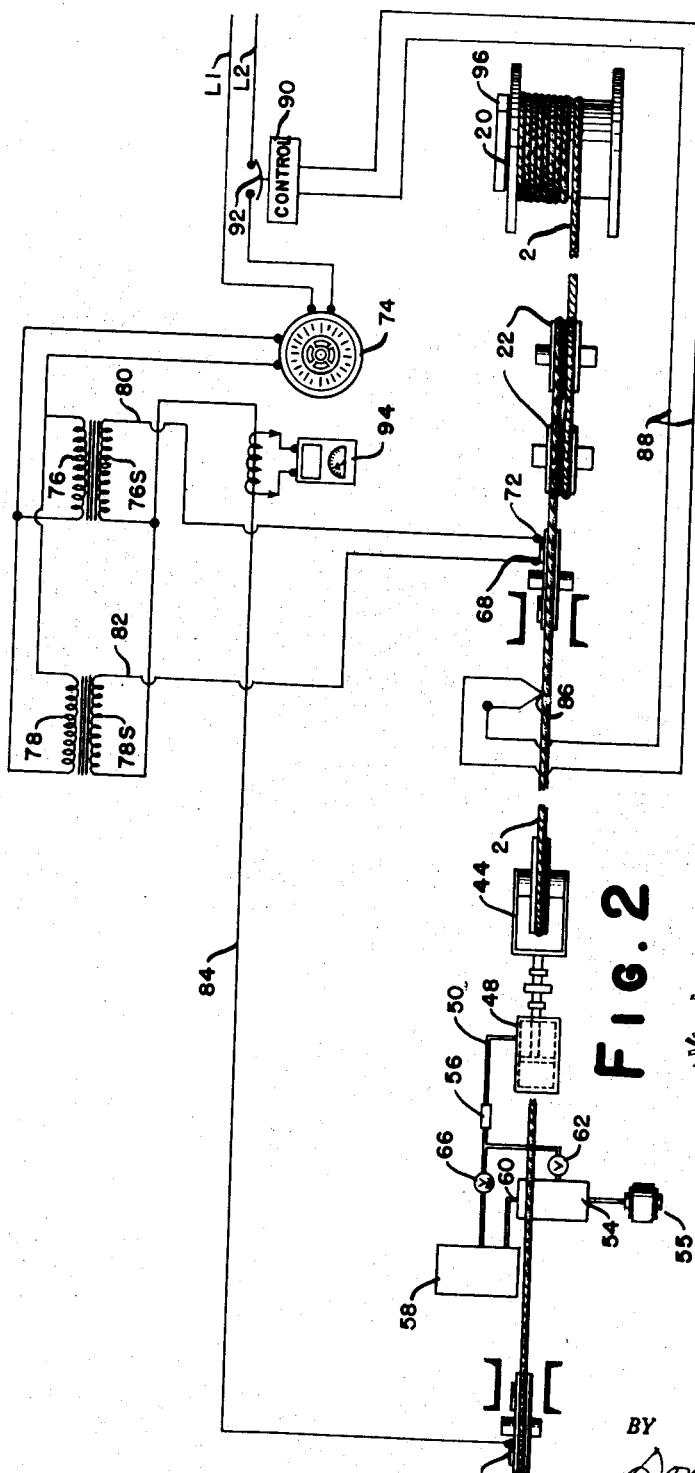
Figure 2 is a schematic plan view of the apparatus of my invention including the heating circuit.

Referring more particularly to the drawings reference numeral 2 indicates an armored well logging cable. The cable 2 has a central electrical conductor 4 made up of a cotton center strand 6 surrounded by six 7-wire strands 8 made of bright hard drawn copper. Each strand 8 has a center wire and six wires laid therearound with a left-hand lay. The strands 8 are laid around the cotton center 6 with a right-hand lay. A cotton winding 10 is laid around the conductor 4 with a right-hand lay. Other relatively soft resilient material may be substituted for the cotton winding. An insulating material, preferably rubber, 12 surrounds the cotton winding 10. A soft cotton braid 14 surrounds the insulation 12. Other soft material may be substituted for the coton braid. A first layer of armored wires 16 surrounds the cotton braid 14 and a second layer of armored wire 18 surrounds the first layer 16. The lay of the wires in the layer 16 is opposite to that of the wires in layer 18. The wires are preferably of steel with the wires in layer 16 being right-hand lay and those in layer 18 being left-hand lay. It will be understood that the cable described above is merely illustrative and cables having other constructions may be utilized in my apparatus.

After the cable has been formed in a conventional manner it is placed on a reel 20. The cable 2 passes from the reel 20 over sheave 21 to a pair of capstan sheaves 22 having a number of grooves therein so that the cable passes around the sheaves a plurality of times. From the sheaves 22 the cable passes successively around sheaves 24, 26, 28, 30, 32, 34, 36 and 38 to a second pair of capstan sheaves 40 similar to sheaves 22 and then to a take-up reel 42. Sheave 26 is electrically insulated from the supporting structure 43, but sheaves 24 and 28 are connected to ground. The reels 20 and 42 are supported in the manner customary when processing cables. The sheave 38 is mounted on a bifurcated arm 44 which is attached to piston rod 46 of an hydraulic cylinder 48. An oil conduit 50 leads to the cylinder 48 and discharges to the right side of piston 52. Oil is supplied to the hydraulic cylinder 48 through conduit 50 by means of a pump 54 which is driven in the usual manner by a motor 55. A gauge 56 is provided in the conduit 50 so that the pressure of the oil is readily apparent to the operator. Oil is supplied to the pump 54 from a tank 58 through a conduit 60. A valve 62 is provided in the conduit 50 so as to control the flow of oil. A conduit 64 connects the conduit 50 to the tank 58. A relief valve 66 is provided in the conduit 64.

Electric current is supplied to the cable 2 between sheaves 24 and 28. For this purpose brush contacts or commutator rings 68, 70 and 72 are provided on sheaves 24, 26 and 28, respectively. The rings are provided on one side of sheaves 24 and 28, but on both sides of sheaves 26 since the electric current passes from that sheave through two lengths of cable 2. Power is supplied to the contact brushes 68, 70 and 72 from power source L1 and L2 through an auto-transformer 74 and transformers 76 and 78. One side of secondary 76S is connected through wire 80 to brush 72. One side of secondary 78S is connected through wire 82 to brush 68. The other side of each of the secondaries 76S and 78S is connected through wire 84 to brush 70. A pyrometer thermocouple 86 is located against the cable 2 adjacent the sheave 28. Thermocouple 86 is connected by means of wires 88 to a control 90 which operates a breaker switch 92 located in line L2. An ammeter 94 is located across the wire 84 to indicate the value of the current.

The reel 20 is provided with a conventional hand operated steel band friction brake 96 which may be set by turning a nut on a threaded bolt so that the cable 2 will not unwind of itself nor unwind too fast when being pulled from the reel. The sheaves 22 are geared together by gearing 98 and are connected by means of a gear reducer 100 to a variable speed oil pump 102 which acts as a brake for applying back tension to the cable. A hand control 104 for varying the drag of the oil pump is provided. The oil passes from an oil tank 106 to the oil brake or pump 102, through a cam operated relief valve 108 and a hand valve 110 back to the tank 106. A cam 112 is mounted on a bifurcated arm 44 for movement therewith and contacts actuating finger 114 of relief valve 108. The sheaves 40 are driven from a motor 116 through a Reeves transmission 118 and gear reducer 120. The take-up reel 42 is driven by a motor 122 through a friction slip clutch 124.

Power for operating the motors 55, 116 and 122 is provided from the lines L3, L4 and L5 through an automatic starter 126 which is controlled by means of a push button switch 128. A separate starter may be provided for each motor. A safety switch 130 is provided in lines 132 between the switch 128 and automatic starter 126. This safety switch 130 is adapted to be contacted by a contact arm 134 mounted on the bifurcated arm 44. A relay coil 136 is mounted across the lines L4 and L5 and operates contacts 136C in lines L1 and L2 leading to the heating circuit. It will be understood that other switches may be provided for controlling the operation of motors 55, 116 and 122 either alone or in various combinations.

The operation of my device is as follows:

Valve 62 is set so that oil at the desired pressure will be fed to the cylinder 48. The relief valve 66 is set so that it will open at a predetermined pressure so that the pressure in cylinder 48 cannot exceed that necessary for applying the desired tensional force to the cable 2. The auto-transformer 74 is set to give the desired power for raising the temperature of the cable 2 to a predetermined point. The hand control of 104 is set so that the pressure necessary to get the desired tension will be obtained. The cable 2 is threaded through the line around sheaves 22 in a series of figure eights and around sheaves 40 in a series of figure eights to the take-up reel 42. Switch 128 is then closed, thus providing power to the heating circuit. As the current flows through the armor wires 16 and 18 the cable 2 will be heated to any desired temperature by means of the $I^2R$ loss in the armor between sheaves 24 and 28. The friction of the cable 2 passing around the sheaves 22 drives the oil pump 102 and causes it to build up an oil pressure so as to apply back tension to the cable as it is moving forward. This back tension can be set to any predetermined load necessary for prestressing the cable. I have found that when a cable is heated to a temperature at least 140° F. and preferably to a temperature between 140° F. and 190° F. while tensional force is applied thereto by means of the hydraulic cylinder 48, permanent elongation will be removed therefrom to such an extent that the cable will not permanently elongate to any great extent under the operating conditions in a deep oil well. The tension applied should be between 40 and 70% of the rated strength of the cable. If the temperature of the cable as indicated by thermocouple 86 becomes too great the control 90 operates to open breaker switch 92. When the operator stops the take-up reel 42 the oil pump motor 55 also stops and the tension or prestressing load on the cable 2 is gradually decreased and the yoke 44 begins to move to the left moving the cam 112 with it. This causes the cam 112 to actuate the relief valve 108 to reduce pressure in the brake 102. When the yoke 112 moves beyond a safe distance to the right the arm 134 contacts switch 130 to open the same and thus stop motors 55, 116 and 122. When the prestressing of a length of cable is almost completed, the line is stopped and a second reel of cable spliced to the end of the first cable, after which the line is started.

While one embodiment of my invention has been shown and described it will be apparent that other adaptations and modifications may be made without departing from the scope of the following claims.

I claim:

1. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes, a pair of pulling sheaves between the second reel and the series of sheaves around which the cable passes, said series of sheaves including a movable sheave, means for applying a back tension to said braking sheaves, means for driving said pulling sheaves, means for driving said second reel, an hydraulic cylinder connected to move said movable sheave toward and away from the other sheaves in said series so as to vary the length of the path of travel between said braking and pulling sheaves, and means for applying heat to said cable between at least two of said sheaves.

2. Apparatus for hot prestressing armored cable comprising a first reel for supporting the cable to be heated, a second reel for receiving the treated cable, a series of fixed sheaves around which the cable passes from the first to the second reel, a pair of braking sheaves between the first reel and the series of sheaves around which the cable passes, a pair of pulling sheaves between the second reel and the series of sheaves around which the cable passes, said series of sheaves including a movable sheave, means for applying a back tension to said braking sheaves, means for driving said pulling sheaves, means for driving said second reel, an hydraulic cylinder connected to move said movable sheave toward and away from the other sheaves in said series so as to vary the length of the path of travel between said braking and pulling sheaves, a pump connected to said hydraulic cylinder, a motor connected to drive said pump, and means for applying heat to said cable between at least two of said sheaves.

3. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes, a pair of pulling sheaves between the second reel and the series of sheaves around which the cable passes, said series of sheaves including a movable sheave, an hydraulic pump connected to be driven by said braking sheaves so as to act as a brake, a motor connected to drive said pulling sheaves, a motor connected to drive said second reel, an hydraulic cylinder connected to move said movable sheave toward and away from the other sheaves in said series so as to vary the length of the path of travel between said braking and pulling sheaves, a second pump connected to said hydraulic cylinder, a motor connected to drive said second pump, and means for applying heat to said cable between at least two of said sheaves.

4. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes, a pair of pulling sheaves between the second reel and the series of sheaves around which the cable passes, said series of sheaves including a movable sheave, an hydraulic pump connected to be driven by said braking sheaves so as to act as a brake, a motor connected to drive said pulling sheaves, a motor connected to drive said second reel, an hydraulic cylinder connected to move said movable sheave toward and away from the other sheaves in said series so as to vary the length of the path of travel between said braking and pulling sheaves, a second pump connected to said hydraulic cylinder, a motor connected to drive said second pump, means for applying heat to said cable between at least two of said sheaves, and means for simultaneously energizing and deenergizing said motors.

5. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes in a series of figure eights, a pair of pulling sheaves between the second reel and the series of sheaves around which the cable passes in a series of figure eights, said series of sheaves including a movable sheave, means for applying a back tension to said braking sheaves, means for driving said pulling sheaves, means for driving said second reel, an hydraulic cylinder connected to move said movable sheave toward and away from the other sheaves in said series so as to vary the length of the path of travel between said braking and pulling sheaves, a heating circuit, and means connecting said heating circuit to at least two of said sheaves.

6. Apparatus for hot prestressing armored cable comprising a first reel for supporting the cable to be heated, a second reel for receiving the treated cable, a series of fixed sheaves around which the cable passes from the first reel and the series of sheaves around which the cable passes in a series of figure eights, a pair of pulling sheaves between the second reel and the series of sheaves around which the cable passes in a series of figure eights, said series of sheaves including a movable sheave, means for applying a back tension to said braking sheaves, means for driving said pulling sheaves, means for driving said second reel, an hydraulic cylinder connected to move said movable sheave toward and away from the other sheaves in said series so as to vary the length of the path of travel between said braking and pulling sheaves, a pump connected to said hydraulic cylinder, a motor connected to drive said pump, a heating circuit, and means connecting said heating circuit to at least two of said sheaves.

7. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes in a series of figure eights, a pair of pulling sheaves between the second reel and the series of sheaves around which the cable passes in a series of figure eights, said series of sheaves including a movable sheave, an hydraulic pump connected to be driven by said braking sheaves so as to act as a brake, a motor connected to drive said pulling sheaves, a motor connected to drive said second reel, an hydraulic cylinder connected to move said movable sheave toward and away from the other sheaves in said series so as to vary the length of the path of travel between said braking and pulling sheaves, a second pump connected to said hydraulic cylinder, a motor connected to drive said second pump, a heating circuit, and means connecting said heating circuit to at least two of said sheaves.

8. Apparatus for hot prestressing armored cable comprising a first reel for supporting the cable to be treated, a second reel for receiving the treated cable, a series of fixed sheaves around which the cable passes from the first to the second reel, a pair of braking sheaves between the first reel and the series of sheaves around which the cable passes in a series of figure eights, a pair of pulling sheaves between the second reel and the series of sheaves around which the cable passes in a series of figure eights, said series of sheaves including a movable sheave, an hydraulic pump connected to be driven by said braking sheaves so as to act as a brake, a motor connected to drive said pulling sheaves, a motor connected to drive said second reel, an hydraulic cylinder connected to move said movable sheave toward and away from the other sheaves in said series so as to vary the length of the path of travel between said braking and pulling sheaves, a second pump connected to said hydraulic cylinder, a motor connected to drive said second pump, a heating circuit, means connecting said heating circuit to at least two of said sheaves, and means for simultaneously energizing and deenergizing said motors and heating circuit.

References Cited in the file of this patent

UNITED STATES PATENTS

| | | |
|---|---|---|
| 2,052,923 | Dunsheath | Sept. 1, 1936 |
| 2,093,411 | Bowden et al. | Sept. 21, 1937 |
| 2,365,952 | Hanson | Dec. 26, 1944 |
| 2,502,005 | Hansell | Mar. 28, 1950 |
| 2,589,283 | O'Grady | Mar. 18, 1952 |
| 2,658,982 | Rendel | Nov. 10, 1953 |
| 2,716,687 | Lackner | Aug. 30, 1955 |
| 2,718,659 | Judisch | Sept. 27, 1955 |

UNITED STATES PATENT OFFICE
CERTIFICATE OF CORRECTION

Patent No. 2,940,883　　　　　　　　　　　　　　　　June 14, 1960

Walter T. Peirce

It is hereby certified that error appears in the printed specification of the above numbered patent requiring correction and that the said Letters Patent should read as corrected below.

Column 5, line 27, after "first" insert -- to the second reel, a pair of braking sheaves between the first --.

Signed and sealed this 15th day of November 1960.

(SEAL)
Attest:

KARL H. AXLINE　　　　　　　　　　　　　　　　ROBERT C. WATSON
Attesting Officer　　　　　　　　　　　　　　　　Commissioner of Patents